E. C. SHAW.
VEHICLE WHEEL RIM.
APPLICATION FILED MAY 2, 1910.

1,141,496.

Patented June 1, 1915.

Attest:
Edgeworth Greene
Edmund Quincy Moses

Inventor: Edwin C. Shaw
by Seward Davis
Atty.

UNITED STATES PATENT OFFICE.

EDWIN C. SHAW, OF AKRON, OHIO, ASSIGNOR, BY MESNE ASSIGNMENTS, TO THE B. F. GOODRICH COMPANY, A CORPORATION OF NEW YORK.

VEHICLE WHEEL-RIM.

1,141,496.     Specification of Letters Patent.     Patented June 1, 1915.

Application filed May 2, 1910. Serial No. 558,973.

*To all whom it may concern:*

Be it known that I, EDWIN C. SHAW, a citizen of the United States, residing in Akron, county of Summit, and State of Ohio, have invented certain new and useful Improvements in Vehicle Wheel-Rims, of which the following is a specification.

This invention relates to vehicle wheel rims of the type designed primarily for carrying pneumatic or other resilient tires in which a portion of the rim carrying the tire can be removed from the wheel and a new tire and rim portion substituted. Rims of this type are commonly known as demountable rims.

Figure 1:
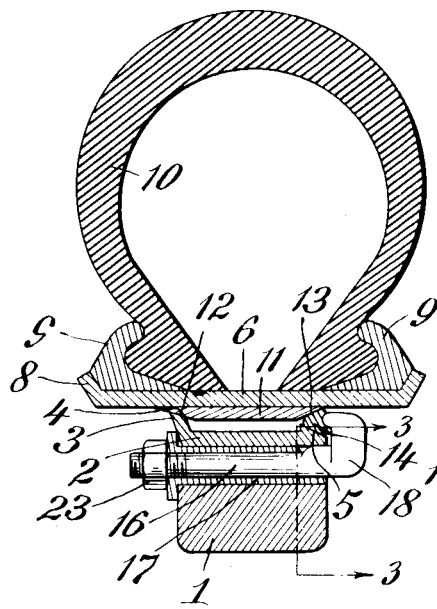
Figure 2:
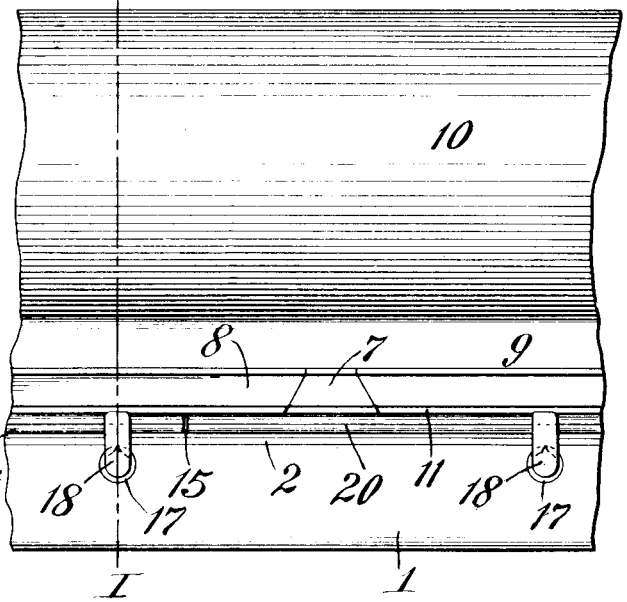
Figures 3, 4:
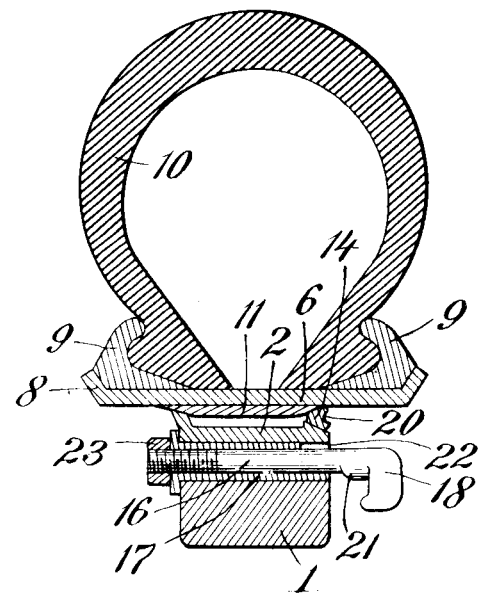

In the accompanying drawings, which form a part of this specification, Figure 1 is a section through a wheel felly, rim and tire illustrating one embodiment of my invention, the section being taken on line I—I of Fig. 2: Fig. 2 is a side elevation of a portion of the wheel felly, rim and tire shown in Fig. 1; Fig. 3 is a detail section on an enlarged scale taken on line III—III of Fig. 1; Fig. 4 is a section similar to Fig. 1, showing the bolt moved to operative position.

Referring to the drawings in detail, the numeral 1 designates the wheel felly, to which is permanently secured the fixed rim portion or band 2 provided at one side with the flange 3 having the inclined upper face 4, and at the other side with the downwardly inclined or tapered face 5. The detachable or tire carrying portion of the rim comprises a band 6 from which is cut a wedge-shaped piece 7 utilized as a locking piece to hold the ends of the band in position when the rim is assembled. The band 6 is provided with side flanges 8 which serve to retain the endless tire retaining flanges 9 which engage the beads of the tire 10. The band has secured to it a member 11 having inclined surfaces 12 and 13, the former of which engages with the inclined surface 4 of the fixed band 2. The surface 13 is engaged by a locking ring 14 preferably split, as indicated at 15, which rests upon the inclined surface 5 of the fixed band. For retaining the locking ring 14 in position, I provide a number of bolts 16 mounted in bushings 17 carried by the felly. The bolts are L-shaped, having hooked heads 18, the tips of which 19 engage in a groove 20 formed in the locking ring. The bolts are provided with lugs 21 which engage slots 22 formed in the bushings 17. When the bolts are in normal position, as indicated in Fig. 1, these lugs serve to prevent the rotation of the bolts. To remove the locking ring from the tire carrying portion of the rim it is simply necessary to partly unscrew the nuts 23 which engage the bolts, draw the bolts out sufficiently to cause the lugs 21 to disengage the slots in the bushings, when the bolts can be turned through half a revolution to the position shown in Fig. 4, when, as will be apparent, their L-shaped heads are entirely out of the way.

I have shown and described one specific embodiment of my invention, but I do not desire to be limited to the details thereof as it is obvious that various changes may be made therein. The particular form of the tire carrying portion of the rim forms no part of this invention, and the means disclosed for locking the removable rim to the wheel may be used for securing any other type of rim to a wheel, such, for instance, as a one-piece clencher rim, or any of the wellknown types of endless rims having one removable tire retaining flange.

Having thus described my invention, I claim:

1. In a vehicle wheel, in combination, a fixed wheel member, a detachable tire carrying rim seated thereon, a bushing projecting transversely through said fixed wheel member and having a notch at one side thereof, and a bolt journaled in said bushing, said bolt having an eccentric head and a lug adapted to enter said notch.

2. In a vehicle wheel, in combination, a fixed wheel member, a detachable tire carrying rim seated thereon, a split locking ring engaging said members, said locking ring having a groove in its outer face, and means for retaining said locking ring in position, said means comprising a plurality of bolts journaled in said fixed wheel member, said bolts having L-shaped heads, the tips of which enter the groove in said locking ring and contact with both walls thereof.

3. In a vehicle wheel, in combination, a fixed wheel member, a detachable tire-carrying rim seated thereon, a split locking ring engaging said members, said locking ring having a centrally located groove in one side thereof, and a member secured to said wheel and having a wedging claw adapted to enter the groove in the ring and thereby position the ring.

4. In a vehicle wheel, in combination, a fixed wheel member, a detachable tire-carrying rim seated thereon, a split locking ring engaging said members, said locking ring having a centrally located groove in one side thereof, said groove having outwardly diverging walls, and means for retaining said locking ring in position including a plurality of bolts mounted on said fixed wheel member, each of said bolts having a wedging claw adapted to enter the groove in the ring and thereby position said ring.

5. In a vehicle wheel, in combination, a fixed wheel member, a detachable tire-carrying rim seated thereon, a bushing projecting transversely through said fixed wheel member, and a bolt journaled in said bushing and having an eccentric projection coöperating with said bushing to positively lock said bolt against rotation when in operative position, and means on said bolt for retaining said rim upon said fixed wheel member.

EDWIN C. SHAW.

Witnesses:
WALTER K. MEANS,
MARCUS H. HILL.